Patented Mar. 15, 1932

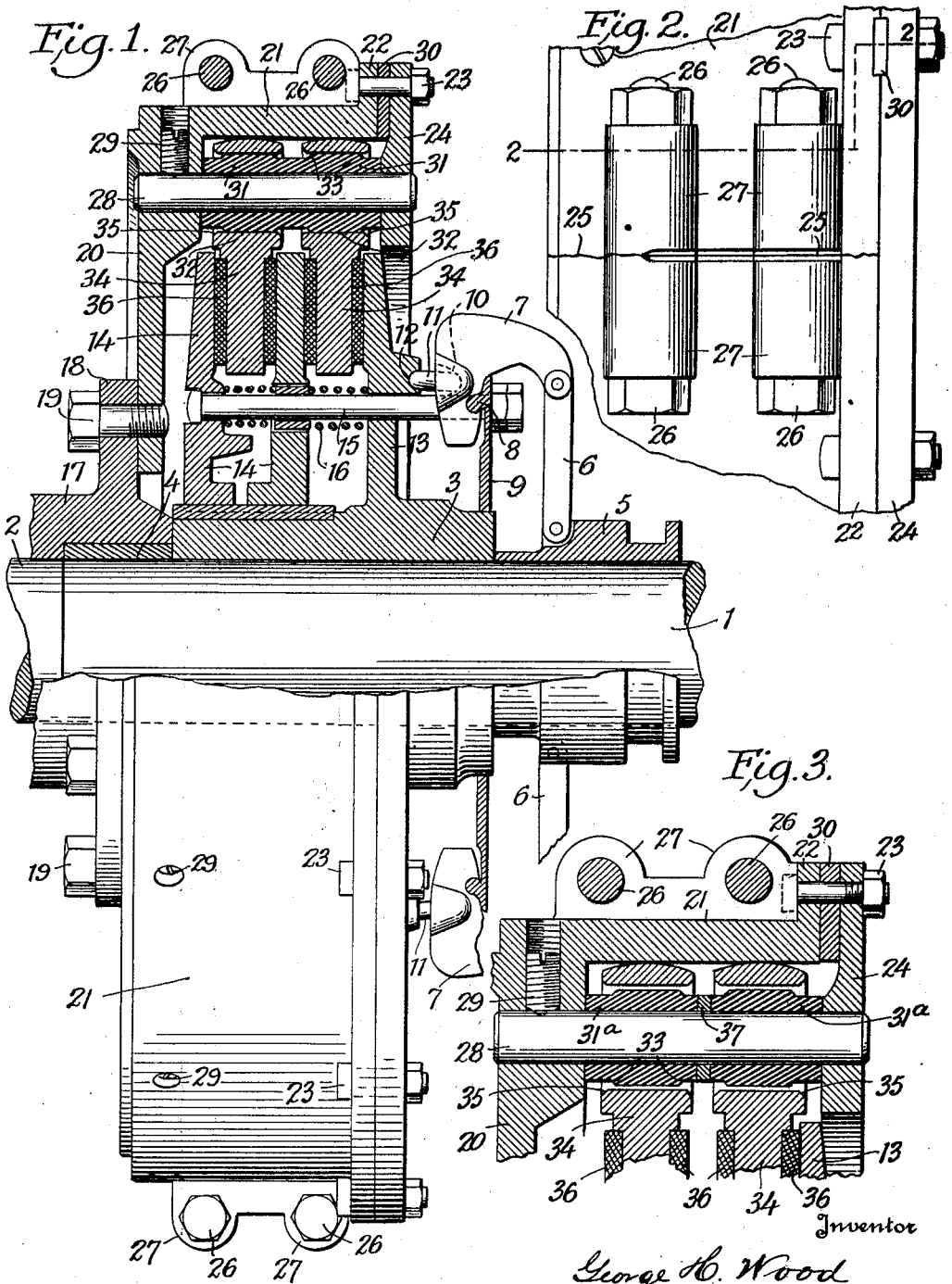

1,849,164

UNITED STATES PATENT OFFICE

GEORGE H. WOOD, OF CHAMBERSBURG, PENNSYLVANIA

FRICTION CUT-OFF COUPLING

Application filed April 11, 1930. Serial No. 443,405.

My invention relates to friction clutches and cut-off couplings for coupling two shafts together so that there shall be an easy starting torque for the shaft to be coupled, and is of the type in which axially movable friction plates are mounted in that part of the clutch mounted on one shaft that cooperate with one or more rod-guided, axially movable friction plates on the other half or part of the coupling, mounted on the contiguous shaft.

It is the object of this invention to provide in such a coupling means to prevent the continual noise due to the striking of the second set of friction plates against their rods, so that this type of clutch will, in operation, be noiseless, greatly reduce the wear of the metal parts, and have flexibility with respect to shafts that are slightly out of line, and is especially adaptable to use where intermittent load or impulse is present.

A constructional embodiment of my invention, which has operated with full satisfaction to the users thereof with heavy duty machines, is illustrated in the accompanying drawings, in which—

Figure 1 is a side view of my coupling partly in vertical section on the line 2—2 of Fig. 2.

Fig. 2 is a plan view of a portion of the clutch casing, showing a key held by one of the holding bolts for the pin ring.

Fig. 3 is a longitudinal section through one of the pins and the co-operating sleeves of a modification.

One shaft, say the driving shaft 1, is aligned with the driven shaft 2, either abutting it or having a countersunk connection one with the other, as is customary with aligned shafts. The shaft 2 is usually directly connected to the machine to be driven.

On one of the shafts, say the driving shaft 1, is a sleeve 3 having at its end a brass bushing 4 terminating at the end of the shaft 1. At the opposite end of the sleeve 3 is the customary shifting collar 5 to which are pivoted the several links 6 pivoted to the separate locking levers 7. These locking levers are hook-shaped, and on one side engage under a bead 8 on a fulcrum ring 9 sliding on sleeve 3. In the opposite faces of the hooks are recesses 10 in which engage one end of short pivot plates 11 whose opposite ends engage recesses 12 on a friction member or plate 13 integral with sleeve 3.

In addition to this are one or more friction members or plates 14 sliding on sleeve 3.

Draw-bolts 15 loosely pass through all these friction plates, the hooked ends of the locking levers and the fulcrum plate, and carry between the friction plates spreader springs for releasing the plates.

The foregoing structure described in detail, is well known.

On the abutting or driven shaft 2 is mounted the other clutch half comprising a sleeve 17 that fits over the brass bushing 4 for keeping the two shafts centered, and has a flange 18 to which is secured by bolts 19 a disc 20 having a flange 21 extending over the aforementioned friction plates 13 and 14. This flange has at its free end an outwardly extending bolting rim 22 through which pass bolts 23 holding an inwardly extending ring 24. However, if rods 28 are sufficiently large they need not have bearing in ring 24 and this ring may then be omitted.

The disc 20, its flange 21 and the flange 22 are preferably, but not necessarily, cast in one piece, and are split at 25 at diametrically opposite points, and the two halves are held together by bolts 26 passing through ears 27.

The disc 20 has bores through it at various points of its outer portion near flange 21, in which are secured rods 28 secured by grub screws 29.

The outer ends of these rods 28 bear in holes in the ring 24, which is positioned for proper alignment of the holes and bores by a key 30 through which one of the bolts 23 passes. Each rod 28 carries a sleeve 31 of flexible, noise-preventing material, as rubber, preferably having portions of enlarged diameter 32 provided with bevelled edges 33, and preferably of less length than the length of the openings or holes in the floating friction members or plates 34. The holes of these plates 34 are also bevelled at 35.

The object of these bevels 33 and 35 is to prevent the floating friction plates 34 from catching on the rubber sleeves as these plates are moved axially the small distance between their released position and their clutched position.

The floating friction plates are not supported by the rubber sleeves, but have bearings at their peripheries on the ring flange 21, thus preventing any wear of the sleeves due to such support as they move back and forth.

The floating friction plates 34 carry friction facings 36, as is customary.

In Figure 1 I have shown the eyes of the floating friction plates 34 as having an easy sliding fit with the sleeves 31, and each sleeve common to all the plates, but in Fig. 3 I have shown considerable space between the eyes and the sleeves, and have provided a separate sleeve 31ª for each plate 34 on each rod 28; and where there is more than one friction plate a washer 37 may be placed between the sleeves.

The operation is similar to that of friction cut-off clutches of similar type, except that when the clutch is closed the rubber sleeves take up the metal to metal shock between the floating plates and the rods and eliminate the constant chatter during service, from the rapid variation of load, for example as when used for driving compressors from oil or gas engines.

It will be noted that the disc 20, flange 21 and ring 24 form a casing substantially closed by the member 13, so that all the parts enclosed thereby are protected from dust and injury.

I claim—

1. In a friction clutch, a disc on one half of the clutch having a flange projecting therefrom thereby forming a chamber for said disc, at least one floating friction disc member peripherally supported within the chamber and guided in its movement in engagement with said flange, rods mounted at one end in said disc and passing through the members, flexible sleeves on the rods along which said members move to a slight extent, and friction members on the other half of the clutch cooperating with the first mentioned members.

2. In a friction clutch, a disc on one half of the clutch having a flange projecting therefrom thereby forming a chamber for said disc, at least one floating friction plate peripherally supported within the chamber and in engagement with said flange, rods mounted at one end in said disc and passing through said plate, a ring on the end of said flange supporting the opposite ends of said rods, yielding sleeves on said rods along which said floating plate has limited movement, and friction plates on the other clutch half cooperating with the aforesaid plate.

3. In a friction clutch, a disc on one clutch half having a flange projecting therefrom forming a chamber for said disc, a plurality of floating friction plate members peripherally supported within the chamber in engagement with said flange, rods mounted at one end in said disc and passing through said members, rubber sleeves on the rods, there being one sleeve for each member on each rod, and friction members on the other clutch half cooperating with the aforesaid members.

4. In a friction clutch, a disc on one clutch half having a flange projecting therefrom forming a chamber for the disc, a plurality of floating friction plate members peripherally supported within the chamber and in engagement with said flange, rods mounted at one end in said disc and passing through said members, rubber sleeves on the rods, there being one sleeve for each member on each rod, a spacing washer between the sleeves on a rod, and friction members on the other clutch half cooperating with the aforesaid members.

5. A friction clutch comprising a clutch half provided with a radial disc, a flange at the periphery of said disc thereby forming a chamber, an inwardly extending ring on the end of the flange, rods secured at one end in the disc and at the other end in the ring, floating friction plates through which said rods pass, said plates peripherally supported within the chamber and in engagement with said flange, and a second clutch half having fixed and movable friction plates cooperating with the floating plates, said fixed plate cooperating with the ring to inclose the other clutch parts between the disc, flange and said ring and the fixed plate.

6. A friction clutch comprising two clutch halves, one half comprising a sleeve for attachment to one shaft, said sleeve having a radial flange, for attachment to said flange a disc having a peripheral flange, both the latter flange and disc being split and bolt-connected, said peripheral flange having a key way in its end, a ring having a key way therein for registry with the first key way and a key entering both key ways, means to hold the ring on the peripheral flange, rods secured at one end in the disc and at the other end in said ring, floating friction plates supported on said rods in peripheral engagement with said peripheral flange and through which said rods pass, and a second clutch half, comprising a second sleeve for said second half on the other shaft, a friction plate fixed to the second sleeve, and slidable friction plates on the second sleeve, said friction plates co-acting with the floating friction plates, and said fixed plate cooperating with said ring to enclose the floating and slidable friction plates in the first clutch half.

In testimony that I claim the foregoing as my invention, I have signed my name hereto.

GEORGE H. WOOD.